(No Model.) 3 Sheets—Sheet 2.

C. W. PRICE.
AUTOMATIC SIGNALING SYSTEM.

No. 594,281. Patented Nov. 23, 1897.

WITNESSES:
Edward Thorpe
C. R. Ferguson

INVENTOR
C. W. Price

BY
[signature]
ATTORNEYS.

(No Model.) 3 Sheets—Sheet 3.

C. W. PRICE.
AUTOMATIC SIGNALING SYSTEM.

No. 594,281. Patented Nov. 23, 1897.

WITNESSES:
Edward Thorpe
C. R. Ferguson

INVENTOR
C. W. Price
BY
ATTORNEYS.

UNITED STATES PATENT OFFICE.

CHARLES W. PRICE, OF NEWARK, NEW JERSEY, ASSIGNOR, BY MESNE ASSIGNMENTS, TO THE MONTAUK MULTIPHASE CABLE COMPANY, OF NEW YORK, N. Y.

AUTOMATIC SIGNALING SYSTEM.

SPECIFICATION forming part of Letters Patent No. 594,281, dated November 23, 1897.

Application filed January 11, 1897. Serial No. 618,767. (No model.)

*To all whom it may concern:*

Be it known that I, CHARLES W. PRICE, of Newark, in the county of Essex and State of New Jersey, have invented a new and Improved Automatic Electromechanical Circuit-Closer, of which the following is a full, clear, and exact description.

This invention relates to devices for automatically closing an electric circuit to sound an alarm at the central office indicating danger from any source—such, for instance, as signaling the existence of a fire in a building or the presence of a burglar—and a main object is to provide a device in which the signal transmitted over the main wires to the central office will be several times repeated, and, further, to provide a simple means whereby the circuit-closer will be automatically stopped.

I will describe a circuit-closer embodying my invention and then point out the novel features in the appended claims.

Reference is to be had to the accompanying drawings, forming a part of this specification, in which similar characters of reference indicate corresponding parts in all the views.

Figure 1:
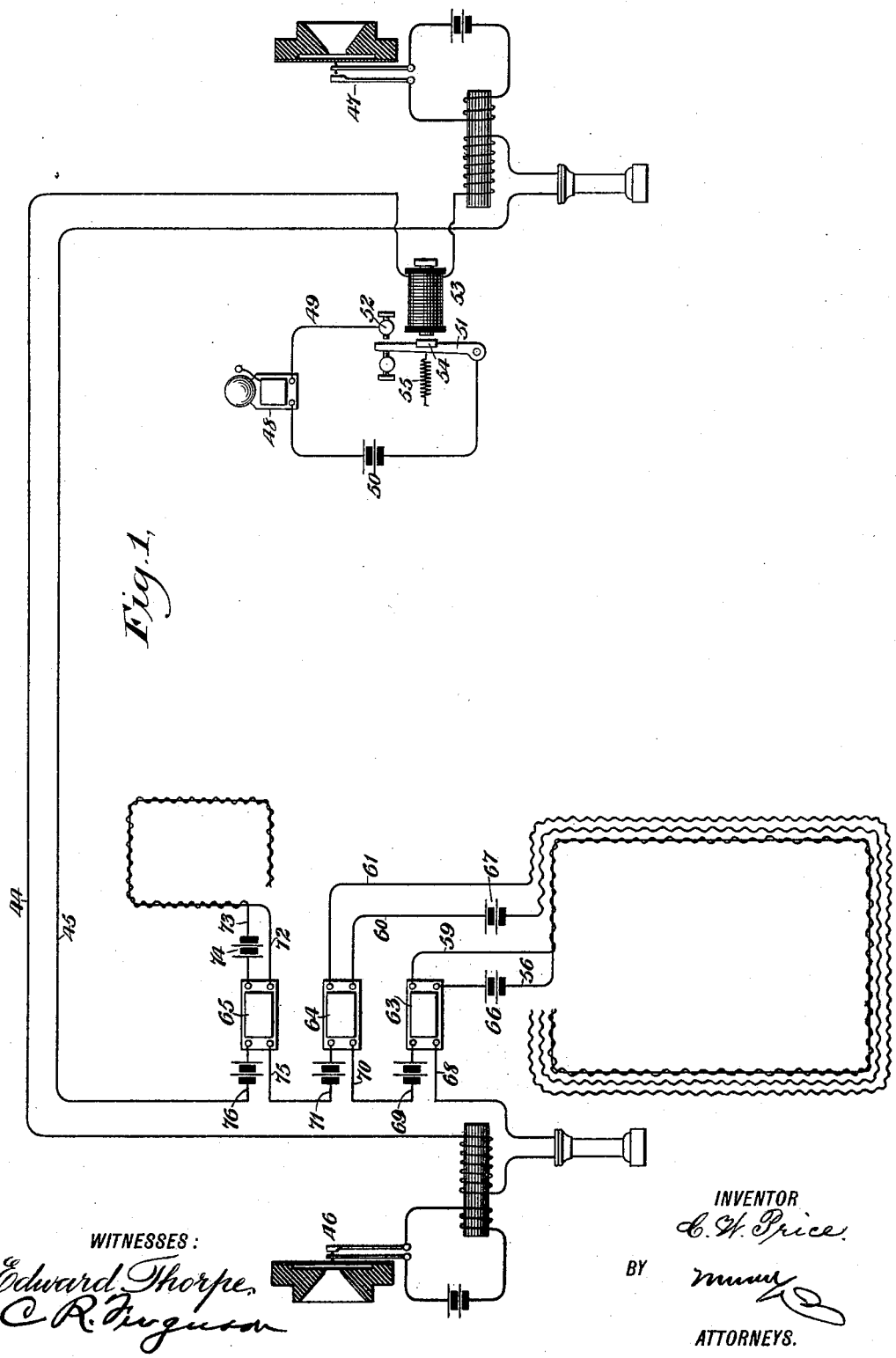
Figure 2:
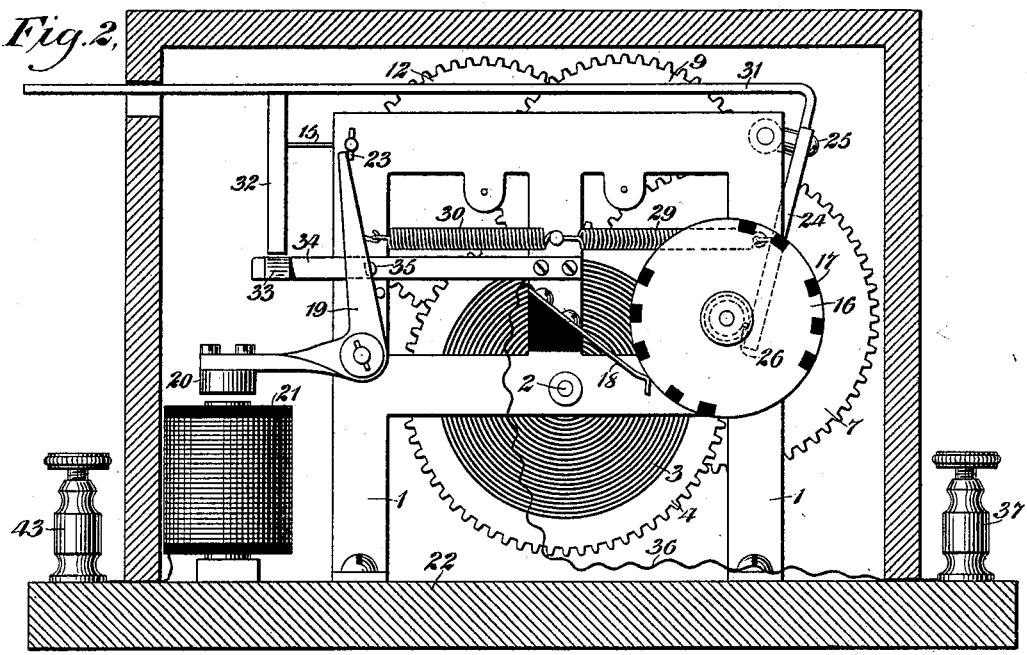
Figure 3:
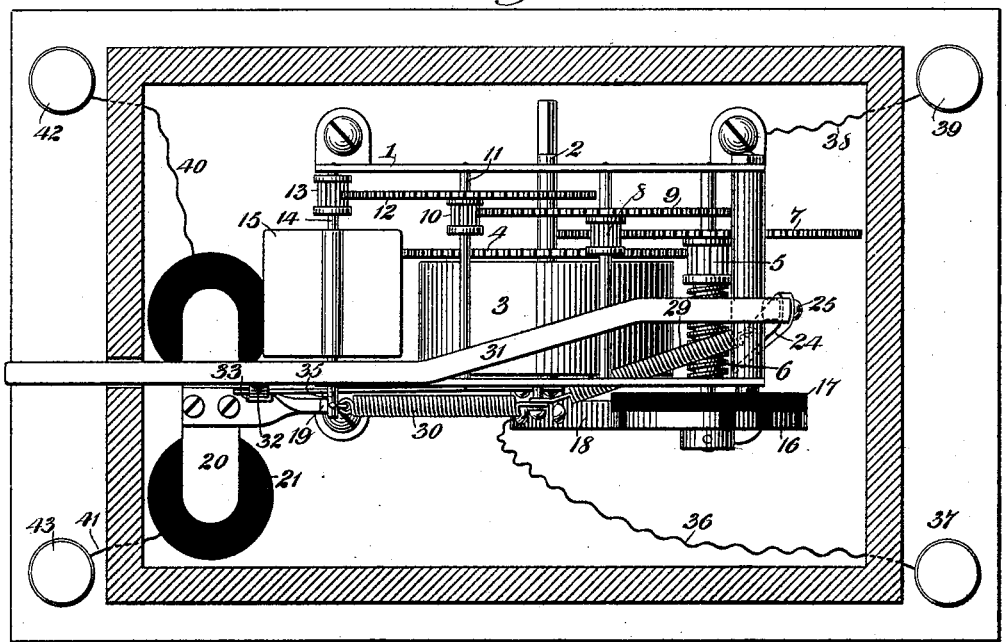
Figure 4:
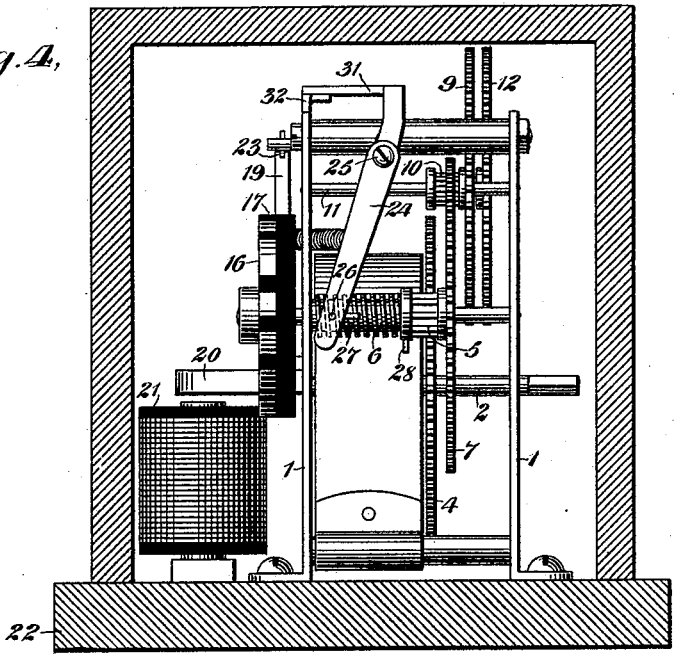
Figure 5:
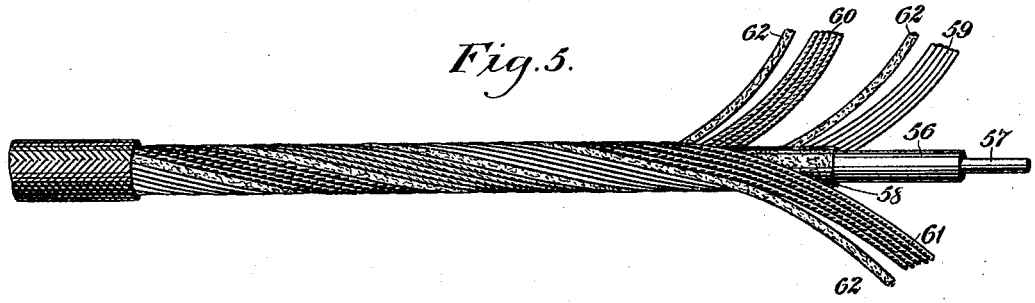

Figure 1 is a diagrammatic view of an electric alarm system embodying my invention. Fig. 2 is a side elevation of the automatic circuit-closer embodied in the invention and showing the casing thereof in section. Fig. 3 is a plan view with the casing in section. Fig. 4 is an end elevation with the casing in section, and Fig. 5 is a plan view of a conducting-cable which may with advantage be used in connection with the circuit-closer.

The circuit-closer comprises a motor, here shown as spring-actuated—that is, mounted in a suitable frame 1 is a main shaft 2, adapted at one end to receive a winding-key, and upon this shaft 2 is mounted a coiled spring 3, having one end attached to the frame and the other end of course attached to the shaft. Mounted on the shaft 2 is a gear-wheel 4, meshing with a pinion 5 on a screw-shaft 6. On the screw-shaft 6 is a gear-wheel 7, meshing with a pinion 8, on the shaft of which is a gear-wheel 9, meshing with a pinion 10 on the shaft 11, supporting a gear-wheel 12, which engages with a pinion 13 on a fan-shaft 14, having bearings in the frame 1 and upon which is mounted a controlling-fan 15.

Mounted on an extended end of the screw-shaft 6 is a circuit-controlling disk comprising a metal portion 16, having notches formed in its periphery, and preferably this metal portion will be mounted upon a disk 17 of insulating material and having a diameter equal to that of the metal portion. Bearing upon the periphery of the circuit-closer and also upon the periphery of the insulating-disk 17 is a contact-brush 18, secured to the frame 1, but insulated therefrom.

Mounted to rock on the frame 1 is an armature-lever 19, having a vertically-disposed portion and a horizontally-disposed portion. On the horizontally-disposed portion is an armature 20, coacting with an electromagnet 21, mounted on the base 22, to which the frame 1 is also secured. The vertically-disposed portion of the armature-lever 19 is designed, when in a normal position, to provide a stop or holder for the motor. As here shown, it is arranged to engage with a pin 23 on the extended end of the fan-shaft 14.

As a means for automatically stopping the motor after a certain number of rotations of the circuit-controller shall have been made I employ a lever 24, fulcrumed on a stud 25, which is mounted to swing on the frame 1. The lower end of the lever 24 is provided with a pin 26, which engages between the threads of the screw-shaft 6. This lever 24 also has a laterally-extended pin 27, designed to engage with a pin 28, projected from a collar at the inner end of the screw-shaft. The lever 24 is held yieldingly against the screw-shaft by means of a spring 29, attached at one end to said lever and at the other end to the frame 1, and it may be here stated that the armature is held normally in open position by means of a spring 30, connected at one end to the frame 1 and at the other end to the armature-lever 19.

A resetting-lever 31 extends from the upper end of the lever 24 longitudinally over the frame 1 and, as here shown, through the casing. Extended downwardly from this resetting-lever 31 is an arm 32, designed to engage with an inclined lug 33 on the free end of a spring-plate 34, supported on the frame 1. Projected from this spring-plate 34 is a pin 35, designed to engage against the rear side of the vertically-disposed portion of the armature-lever 19 to hold the same out of the line of movement of the pin 23 on the fan-shaft 14. This engagement of course will take place when the armature is attracted by the electromagnet—that is, the spring-plate will spring upward.

The brush 18 has a wire connection 36 with a binding-post 37, and the frame 1 has a wire connection 38 with a binding-post 39, and to these binding-posts 37 and 39 the main-circuit wires are designed to be connected. The electromagnet 21 has wire connections 40 and 41 with the binding-posts 42 and 43, which are designed for connection with the local alarm-circuit wires.

I will now describe the device in connection with an alarm system, referring particularly to Fig. 1, which shows main-line wires 44 and 45, providing communication between a local telephone 46 and a central-office telephone 47. At the central-office section of the main line is an alarm, here shown as a bell 48, the electromagnets of which are located in an auxiliary circuit 49, controlling a battery 50. One end of this auxiliary circuit 49 communicates with a pivoted armature-lever 51 and the other end of said wire is connected to a contact-point 52, designed to be engaged by the armature-lever to close the circuit when the said armature-lever is actuated or attracted by the electromagnet 53, located in the main wire 44. The armature 54 on the lever 51 is held normally out of engagement with the electromagnet 53 by means of a spring 55.

Before proceeding further in the description of the system illustrated in Fig. 1 it may be well to describe a conducting-cable which I preferably employ in the local circuit for closing said circuit in case of fire, or by short-circuiting by means of cutting or attempting to cut the wires. This cable is illustrated in Fig. 5 of the drawings and in itself does not constitute any part of my present invention. Referring to Fig. 5, the cable consists of a core 56 of fusible material—such, for instance, as lead—and for the purpose of additional conductivity this core may have a copper or similar wire 57 extending longitudinally through it. An insulating material 58 surrounds the core 56, and spirally wound around this insulating material is a series of conductors 59, 60, and 61, the several conductors being insulated from one another by means of a cord 62.

In Fig. 1 I have shown three circuit-controllers in connection with the main wires 44 and 45, and of course these circuit-controllers will be arranged to transmit different messages or alarms to the central office. For instance, the first circuit-controller 63 will have its controlling-disk 17 arranged to make and break connections, which indicate the number "23," as shown in Fig. 2. The next circuit-controller 64 may be arranged to indicate "24," and the next circuit-controller 65 to indicate the number "25." The circuit-controllers 63 and 64 have their electromagnets 21 in connection with the conductors of the cable illustrated in Fig. 5—that is, the controller 63 has connection with the fusible core 56 and with the spirally-wound conductor 59—and the controller 64 has connection with the conductors 60 and 61. Therefore two circuits are comprised in this cable, and each circuit is provided with a battery 66 67.

The binding-posts 37 and 39 of the controller 63 are connected by wires 68 and 69 with the main wire 44, and a battery is comprised in these connecting-wires. The binding-posts 37 and 39 of the controller 64 are connected by wires 70 and 71 to the main wire 44, and a battery is comprised in these connecting-wires.

The cable having connection with the controllers 63 and 64 is designed to be extended around a building in any desired manner, and should a fire occur the heat will fuse the core 56 and connect it with the wire 59, thus closing the circuit to energize the electromagnet 21 to release the controller. Should a person attempt to cut the wire or cable, the knife or other instrument employed for the purpose will close the circuit between the wires 60 and 61, thus causing the controller 64 to operate and sound an alarm at the central office.

With the arrangement just described it is obvious that an alarm transmitted by short-circuiting the conductors of the cable may serve two purposes, one to indicate the presence of a fire and the other to indicate the possible presence of an incendiary who may attempt to cut the wire to prevent the operation of the fire-alarm.

The controller 65 has its electromagnets 21 in connection with wires 72 and 73, which may be distributed about a building in the usual manner for sending in an alarm indicating the attempted entrance of a burglar—that is, the wires may be extended around windows and doors having circuit-closing mechanism that will be closed by the opening of the windows or doors. This circuit will include a battery 74. From the binding-posts 37 and 39 of the controller 65 wires 75 and 76 extend to connections with the wire 45, and these connections may be provided with a suitable battery. It is to be understood, however, that the batteries of the several connecting-wires may be omitted, as the batteries or other source of electricity of the main wires will be sufficient.

In the drawings I have shown the circuit-controller as arranged for a normally-closed circuit; but it is obvious that by changing the circuit making and breaking arrangement of the disk 17 the device may be employed in a normally open circuit.

In operation should the circuit through the electromagnets 21 be closed by any means the armature 20 would be drawn downward and move the vertically-disposed member of the armature-lever 19 out of the line of movement of the pin 23 and then the motor will be free to operate and rotate the circuit-closer comprising the disk 17. This disk by rotating a considerable number of times will cause the alarm to be repeated at the central office. As the disk rotates the screw-shaft 6 will cause the lever 24 to move along the same until it reaches its inner end, when the pin 26 will come into line with the pin 28 and cause the motor to stop. The lever 24 may be reset to its normal position at the end of the screw-shaft nearest the controlling-disk by pushing downward on the shifting-lever 31 and releasing the pin 26 from the screw-threads. Then the spring 29 will draw the lever back to its normal position. This downward movement of the shifting-lever 31 will cause the part 32 to engage with the beveled lug 33 on the spring-plate 34 to force said spring-plate rearward and move the pin 35 out of engagement with the armature-lever 19, and then the spring 30 will rock said lever to its normal position to engage the pin 23.

Having thus described my invention, I claim as new and desire to secure by Letters Patent—

1. An electromechanical controller for an electric circuit, comprising a motor, a screw-shaft operated by said motor, a circuit making and breaking disk for a main circuit on said screw-shaft, a pivoted lever movable by said screw-shaft and adapted to stop the motor after a certain number of rotations of the circuit-controlling disk shall have been made, an electromagnet in a local circuit, an armature-lever operated by said electromagnet for releasing the motor, a spring-plate for locking the armature-lever, and a lever serving to move the spring-plate out of engagement with the armature-lever, and also serving to return the locking-lever to its normal position, substantially as specified.

2. An electromechanical controller for an electric circuit, comprising a spring-driven motor, a screw-shaft operated by said motor, a main circuit making and breaking disk on said screw-shaft, a pivoted lever having a pin engaging between the threads of said screw-shaft, a pin extended laterally from said lever, a pin extended from the screw-shaft at its end opposite that upon which the disk is mounted, and adapted to engage with the pin on the lever, a shifting-lever extended from the first-named lever, an electromagnet comprised in a local circuit, an armature-lever operated by said electromagnet, for releasing the motor, a spring-plate for holding said armature-lever in its inoperative position, and an arm on the shifting-lever for moving said spring-plate out of engagement with the armature-lever, substantially as specified.

CHARLES W. PRICE.

Witnesses:
JNO. M. RITTER,
C. R. FERGUSON.